May 20, 1958 T. S. TEETOR 2,835,846
CONTROLLED BEAM CENTERING DEFLECTION CIRCUIT
Filed Sept. 2, 1954
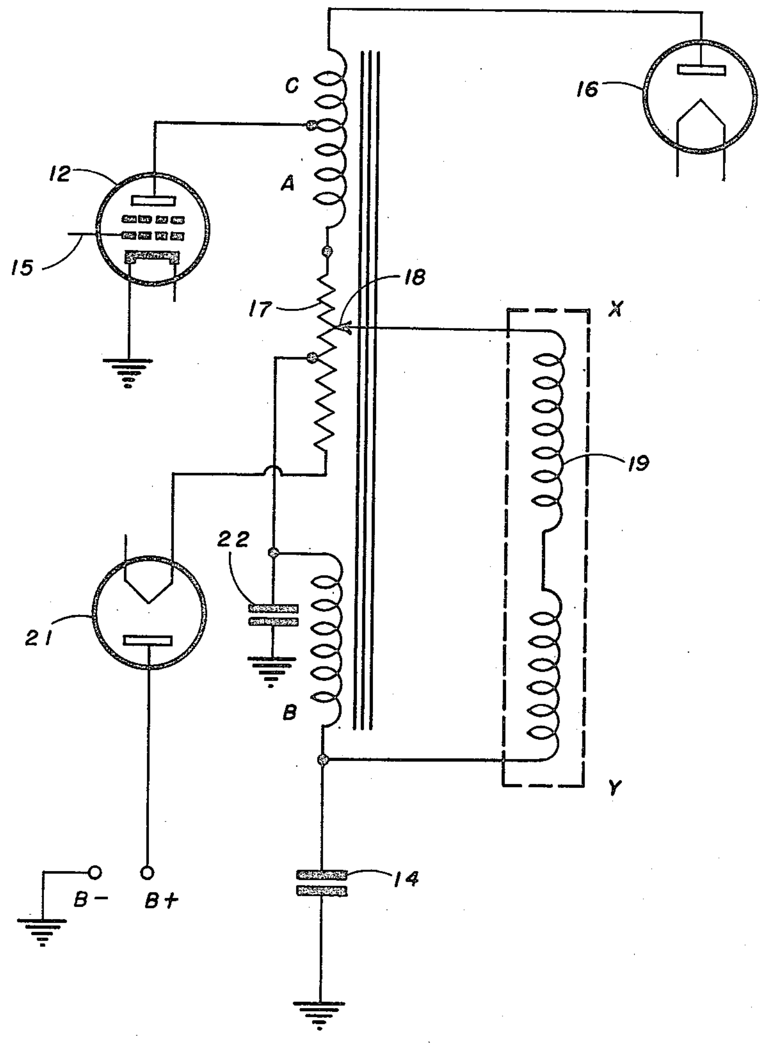
INVENTOR.
THOMAS S. TEETOR.
BY Alden D. Redfield
Norman J. O'Malley
ATTORNEYS.

United States Patent Office 2,835,846

Patented May 20, 1958

2,835,846

CONTROLLED BEAM CENTERING DEFLECTION CIRCUIT

Thomas S. Teetor, Cincinnati, Ohio, assignor to Avco Manufacturing Corporation, Cincinnati, Ohio, a corporation of Delaware Application September 2, 1954, Serial No. 453,780

4 Claims. (Cl. 315—27)

The present invention relates generally to television systems wherein the electron scanning beam of the cathode-ray tube is electromagnetically deflected to effect reproduction of an image, and more specifically to an electromagnetic deflection circuit and beam centering control circuit.

Television receiver circuits which utilize electromagnetic deflection generally include a horizontal deflection transformer driven or controlled by a driver tube acting in conjunction with a damper tube to provide what is known as "reaction" type scanning. Thus, the damper tube and driver tube are connected in such a manner that a portion of the energy stored in the circuit inductance during the retrace period of the cathode-ray beam is recovered across a circuit sometimes known as the "B boost" circuit. The energy stored in the "B boost" circuit, or at least a portion thereof, is then returned as useful deflection energy during the trace period. In these circuits the current supplied through the damper diode to the "B boost" circuit is combined in the deflection yoke windings with current flowing through the driver tube in such fashion as to cause a linear algebraic summation current to flow through the yoke windings, resulting in substantially uniform deflection of the cathode-ray beam at the scanning frequency.

Centering of the electron beam requires the application of a controlled electromagnetic field, either because the average cathode-ray tube gun structure is not properly centered or because of the decentering effect of the ever-present earth's magnetic field and stray fields set up by adjacent receiver circuitry.

The majority of prior art beam centering circuits provide direct current from a power source external to the deflection circuit in controllable quantities and polarities, whereby the beam may be centered, regardless of the direction or amount of the beam centering error. Some circuits have been developed which utilize a complicated bridge arrangement in order to eliminate the necessity for an external current source. Bridge circuits invariably include otherwise unnecessary and expensive components and controls which add to the cost of a receiver and thus, in low-cost black and white receivers, it is current practice to merely magnetize the yoke support sufficiently to correct for centering errors caused by the earth's magnetic field.

Beam centering errors in a color television receiver cause color purity errors to appear in addition to errors in the centering of the picture frame. Thus, color receivers require a control which can be adjusted for beam centering errors brought about, not only by the earth's magnetic field, but by any other cause. Though the prior art external source circuits and bridge circuits are suitable, insofar as they are able to accomplish the desired result, it would be desirable to provide a centering circuit which eliminates all needless and expensive components without any sacrifice of beam centering control.

Thus, it is an object of this invention to provide a magnetic deflection and beam centering circuit capable of shifting the undeflected cathode-ray beam centering position horizontally, either to the right or left of center, to compensate for beam centering error, using a minimum of components and a single source of direct current.

It is also an object of this invention to provide cathode-ray beam centering controls in an autotransformer type of deflection circuit.

Briefly, the invention comprises an autotransformer type of deflection circuit supplied from a single source which is arranged to provide deflection currents through the deflection coils of a cathode-ray tube for deflecting the cathode-ray beam cyclically across the tube image screen and to provide controllable direct current for centering the undeflected position of the beam.

For a better understanding of the present invention, together with other and further objects, advantages and capabilities thereof, reference is made to the following disclosure and appended claims, in connection with the accompanying drawing in which the single figure is a circuit diagram of the preferred embodiment of the invention.

The preferred embodiment, as applied to horizontal deflection circuitry, comprises an autotransformer having two windings, A and B, coupled between the anode of driver tube 12 and the B-boost capacitor 14. Driver tube 12 includes a control grid 15 which may be driven from a source of saw-tooth shaped pulses, not shown. High voltage winding C, which is connected between the anode of high voltage rectifier 16 and the junction of coil A and the anode of tube 12, comprises a conventional high voltage winding placed on the same core as windings A and B.

Coils A and B are coupled together by potentiometer 17. The lower portion of coil A is connected to one of the end terminals of potentiometer 17, and the upper portion of coil B is connected to a fixed tap on the resistance element of the potentiometer. Variable tap 18, which comprises the beam centering control, is coupled to one side of the deflection coil windings 19. The other side of the deflection coil windings is coupled to the lower end of transformer winding B. Most receivers require a width inductance and linearizing capacitors in the deflection coil circuit; however, since these elements form no part of the invention, they have been omitted in order to simplify circuit disclosure and explanation of circuit operation.

A damper diode 21, which may comprise a plurality of diode elements whenever individual design requirements call for large amounts of D. C. current, is coupled between the source of B+, not shown, and the lower terminal of potentiometer 17. Capacitor 22, which is coupled between the upper end of transformer winding B and ground, is used to tune the inductance portion of the circuits connected in parallel therewith, from an alternating current viewpoint, so as to modify the deflection system retrace period and thereby increase system efficiency. The negative terminal of the B+ source can be considered as connected to ground, or an equipotential plane in its broadest sense, as shown.

Operation of the preferred embodiment can be understood most readily from a consideration of both an alternating current and a direct current analysis. Considering the circuit from the alternating current viewpoint, let it be assumed that the retrace period had just ended, at which time the driver tube 12 is cut off, leaving the deflection coil inductance to oscillate freely with its inherent and connected capacitances. At this instant, the deflection coil, due to its collapsing magnetic field, acts as a generator with its Y terminal positive relative to its X terminal. Current flows out of the terminal X end of the deflection coil to charge the inherent or tuning capacitance. As the parallel capacitance starts to charge, the current through the coils slowly decreases, reaching zero at the instant when the voltage across the coils reaches a maximum, making terminal X positive relative to terminal Y. As the potential at terminal X moves in the positive going direction relative to terminal Y, it reaches a value at which diode 21 becomes biased to cutoff, and current ceases to flow through the diode.

The inherent capacitance then discharges back through the deflection coils, reversing the polarity direction of current flow, and the voltage across the deflection coils starts decreasing from a maximum towards a minimum. During this voltage excursion, a coil voltage value is reached where the cathode of diode 21 is biased negative relative to its anode, and current again starts to flow from the B+ supply through diode 21, potentiometer 17, deflection coils 19 and B-boost capacitor 14. The resulting current flow through B-boost capacitor 14 places a charge across the capacitor, which acts as a bias on diode 21, thereby slowly decreasing current flow through this tube.

Driver tube 12 is then driven into conduction by a positive signal excursion on its control grid before damper tube current flow decreases to zero. The current drawn by driver tube 12 also contains a deflection coil component, and the total current through the deflection coils comprises the algebraic sum of the damper tube current and the driver tube current. When the current flowing through driver tube 12 equals the current drawn through damper tube 21, the alternating current component through the deflection coils decreases to zero. As the cycle continues, driver tube 12 starts to conduct more current than can be supplied by the damper diode 21, thereby reversing the current flow through the deflection coils. This additional current is supplied by B-boost capacitor 14.

Driver tube 12 and damper diode 21 conduct through the remaining portion of the cycle until driver tube 12 is cut off at the start of retrace by a negative voltage excursion on its control grid. Again, the tuned circuit comprising the inductance of deflection coils 19 and its inherent and connected capacitances is shock-excited into oscillation. During the first quarter of the oscillatory cycle, deflection yoke current charges up these capacitances to the point where they discharge, starting the second quarter of the oscillatory cycle, again causing current to flow out of coil terminal Y through the B-boost capacitor and damper diode 21.

In considering operation of the preferred embodiment disclosed in the drawing, from a direct current viewpoint, it must be remembered that the term "direct current" can be defined as the average current flow over a complete cycle. Thus, the direct current flow through driver tube 12 comprises the average current through the driver tube, and even though this tube is cut off during a portion of each cycle, it is still possible to consider the instantaneous currents as comprising both an alternating current component and an average or continuously flowing direct current component. For this reason, consideration of the direct current cycle need not involve a consideration of the intermittent nature of current flow through diode 21 and driver tube 12.

All the direct current flowing through driver tube 12 must be derived from the single B+ potential source and must flow through diode 21. The portion of this direct current flow from the damper diode 21 may also flow through deflection coils 19, depending upon the position of potentiometer contact 18.

If potentiometer contact 18 is positioned a given amount above the tap on the potentiometer to which coil B is connected, no direct current will flow through deflection coil windings 19. This condition obtains when the direct current voltage drop across coil B is equal to the direct current voltage drop between the variable tap 18 and the fixed tap on the potentiometer to which the upper portion of coil B is attached. As movable contact 18 is moved higher on potentiometer resistance 17, it can be seen that terminal X of the deflection coil winding becomes more negative than terminal Y, causing direct current to flow through the deflection coils from terminal Y to terminal X. However, if the tap 18 is lowered past the fixed coil B tap, it can be seen that terminal X of the deflection coils becomes more positive than terminal Y, and direct current flows through the deflection coils from terminal X to terminal Y. Thus, it is possible to control the direct current flow through the deflection coils by merely adjusting variable tap 18.

This resulting direct current flow through the deflection coils, as is well known to those skilled in the art, establishes a deflection coil field which acts on the cathode-ray beam in addition to the alternating current field which deflects the beam in the desired sweep pattern. Thus, adjustment of the variable tap 18, by changing the amount and polarity of the direct current flow through the deflection coil, changes the strength and direction of the resulting direct current field component so as to move the undeflected cathode-ray beam position as desired from either the right or left in the horizontal plane. Regardless of the source of centering error, be it due to stray magnetic fields or cathode-ray tube gun alignment errors, it becomes possible to center the beam through action of the variable tap 18 on potentiometer 17.

While I do not desire to be limited to any specific circuit parameters, such parameters being in accordance with individual circuit requirements, the following circuit values have been found entirely satisfactory in one successful embodiment of the invention, in accordance with the circuit disclosed in the drawing:

| | | |
|---|---|---|
| Resistor **17** | ohms | 40 |
| Capacitances: | | |
| **14** | mf | 20 |
| **22** | mmf | 100 |
| Coils: | | |
| Winding A | turns | 305 |
| Winding B | do | 555 |
| Winding C | do | 1700 |
| Tubes: | | |
| **12** | | 6CD6 |
| **16** | | 1B3 |
| **21** | | 6AU4 |

While there has been found and described what is at present considered the preferred embodiment of the invention, it will be obvious to those skilled in the art that various changes and modifications may be made therein without departing from the appended claims.

Having thus described my invention, I claim:

1. In a television receiver reaction scanning circuit, the combination comprising an autotransformer having a first coil portion and a separate second coil portion, both coil portions being wound on a common magnetic core, potentiometer means having two end terminals and two intermediate taps, one fixed and the other variable, means connecting one potentiometer end terminal to said first coil portion, means connecting said second coil portion to the fixed tap on said potentiometer means, a direct current source having positive and negative terminals, diode rectifier means having an anode direct current coupled to the positive terminal of said direct current source and a cathode direct current coupled to the remaining end terminal on said potentiometer means, deflection coils direct current coupled between the variable tap on said potentiometer means and said second coil portion, a B-boost capacitance connected between said second coil portion and the negative terminal of said direct current source, and a driver tube electron conduction path coupled between said first coil portion and the negative terminal of said direct current source, the space relationship between the two potentiometer taps being adjustable to vary the amount and direction of direct current flow through said deflection coils.

2. In a television receiver scanning circuit, the combination comprising an autotransformer having a first coil portion and a separate second coil portion, both coil portions being wound on a common magnetic core, potentiometer means having two end terminals and two intermediate taps, one fixed and the other variable, means connecting one potentiometer end terminal to said first coil portion, means connecting said second coil portion to the fixed tap on said potentiometer means, a direct current source having positive and negative terminals, diode rectifier means having an anode direct current coupled to the positive terminal of said direct current source and a cathode direct current coupled to the remaining end terminal on said potentiometer means, deflection coils direct current coupled between the variable tap on said potentiometer means and said second coil portion, and a driver tube having an anode-cathode path coupled between said first coil portion and the negative terminal of said direct current source, the space relationship between the two potentiometer taps being adjustable to vary the amount and direction of direct current flow through said deflection coils.

3. In a television receiver scanning circuit, the combination comprising an autotransformer having a first winding and a separate second winding, both windings being wound on a common magnetic core, resistance means having two end terminals and two intermediate taps, one fixed and the other variable, means connecting one resistance end terminal to said first winding, means connecting said second winding to the fixed tap on said resistance means, a direct current source having positive and negative terminals, diode rectifier means having an anode direct current coupled to the positive terminal of said direct current source and a cathode direct current coupled to the remaining end terminal on said resistance means, deflection coils direct current coupled between the variable tap on said resistance means and said second winding, a B-boost circuit coupled between said second coil portion and the negative terminal of said direct current source, and a driver tube having an anode-cathode path coupled between said first winding and the negative terminal of said direct current source, the space relationship between the two resistance taps being adjustable to vary the amount and direction of direct current flow through said deflection coils.

4. In a television receiver scanning circuit, the combination comprising an autotransformer having a first coil portion and a separate second coil portion, both coil portions being wound on a common magnetic core, potentiometer means having two end terminals, a fixed tap and a variable tap, means connecting one potentiometer end terminal to said first coil portion, means connecting said second coil portion to the fixed tap on said potentiometer means, a direct current source having positive and negative terminals, rectifier means having an anode direct current connected to the positive terminal of said direct current source and a cathode direct current connected to the remaining end terminal on said potentiometer means, deflection coils direct current coupled between the variable tap on said potentiometer means and said second coil portion, a driver tube having an anode-cathode path coupled between said first coil portion and the negative terminal of said direct current source, whereby the amount and direction of direct current flow through said deflection coils may be varied by adjusting the position of said variable potentiometer tap.

References Cited in the file of this patent

UNITED STATES PATENTS

| | | |
|---|---|---|
| 2,477,557 | Torsch | July 26, 1949 |
| 2,587,313 | Grundmann | Feb. 26, 1952 |
| 2,612,622 | Thalner | Sept. 30, 1952 |
| 2,644,103 | Fyler et al. | June 30, 1953 |
| 2,743,381 | Dietch | Apr. 24, 1956 |